March 31, 1964     F. E. DAVIS, JR     3,127,247
ALTERNATE ANNULAR ISOTHERMAL REACTOR
Filed April 22, 1960     7 Sheets-Sheet 1
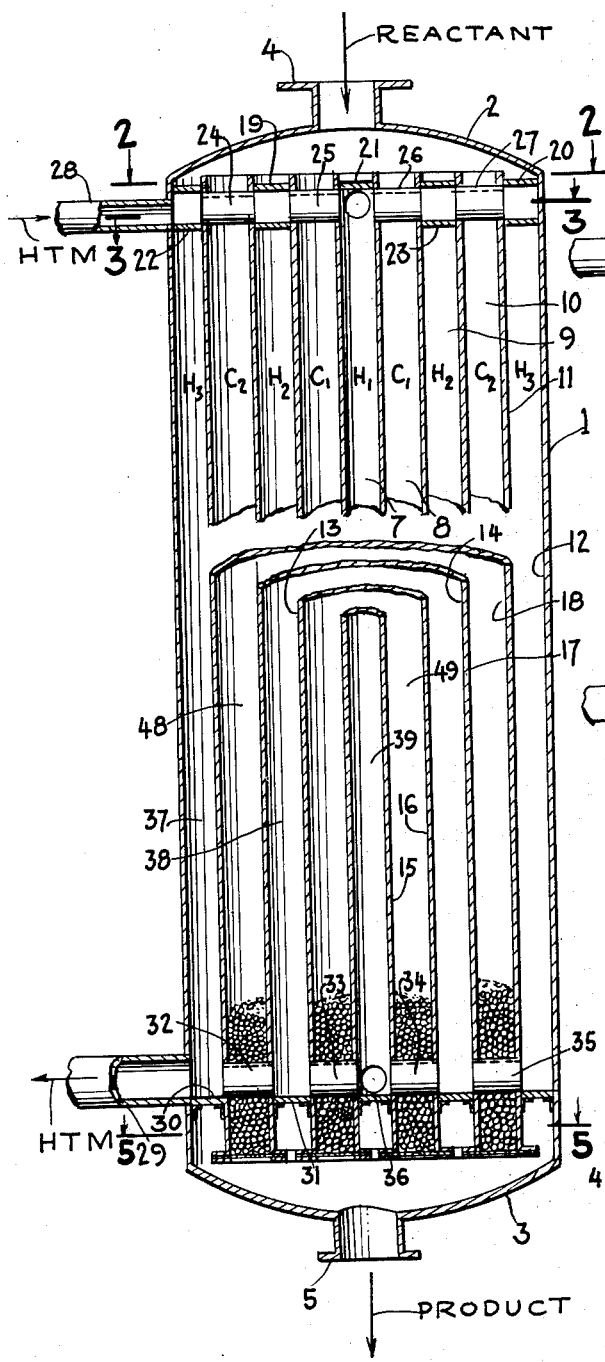
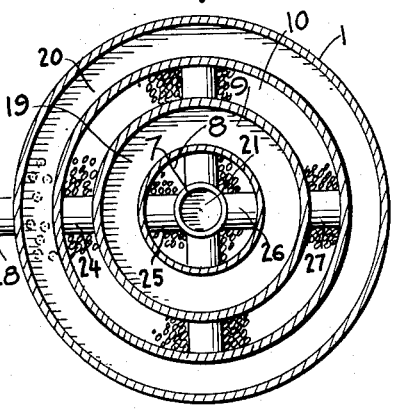
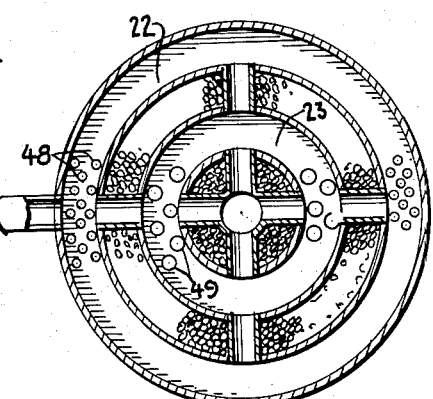
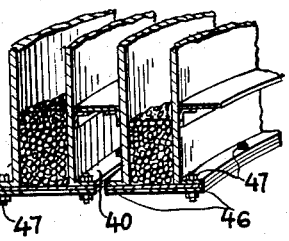
INVENTOR
F. EARLE DAVIS JR.
BY Francis Johnston
AGENT March 31, 1964  F. E. DAVIS, JR  3,127,247
ALTERNATE ANNULAR ISOTHERMAL REACTOR
Filed April 22, 1960  7 Sheets-Sheet 2
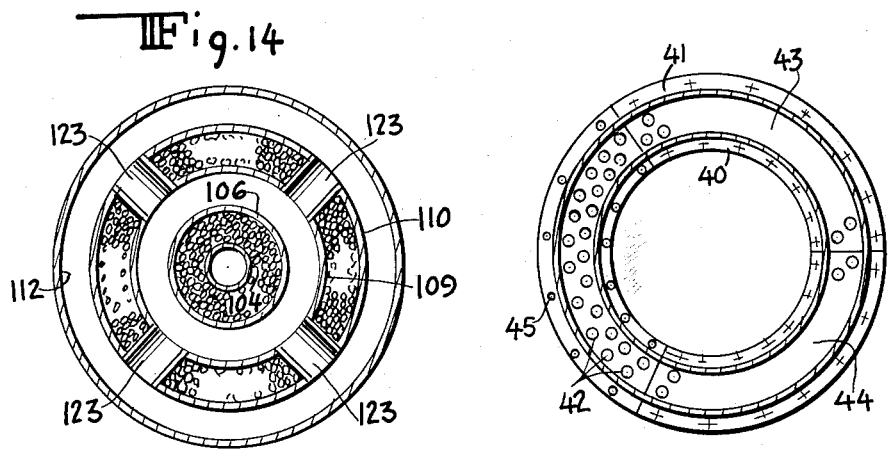
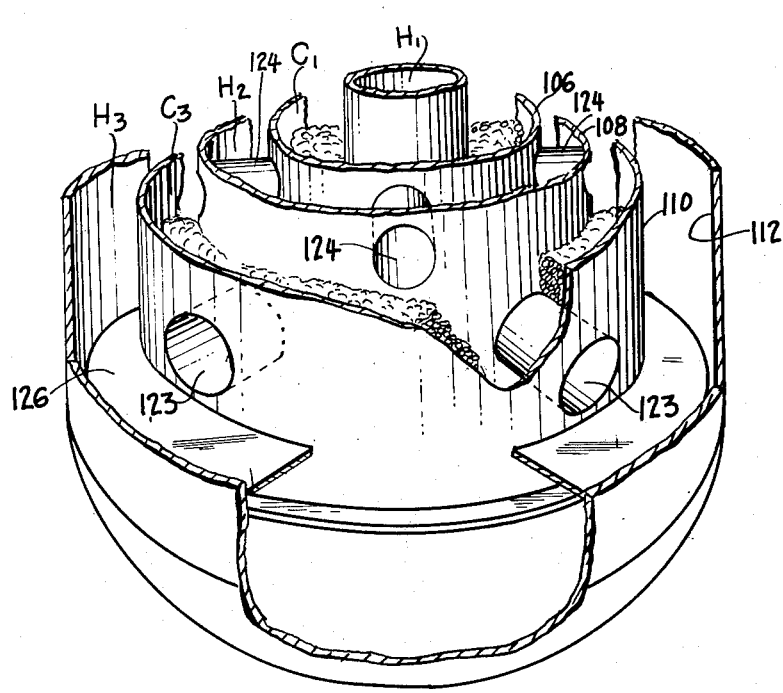
INVENTOR
F. EARLE DAVIS JR.
AGENT

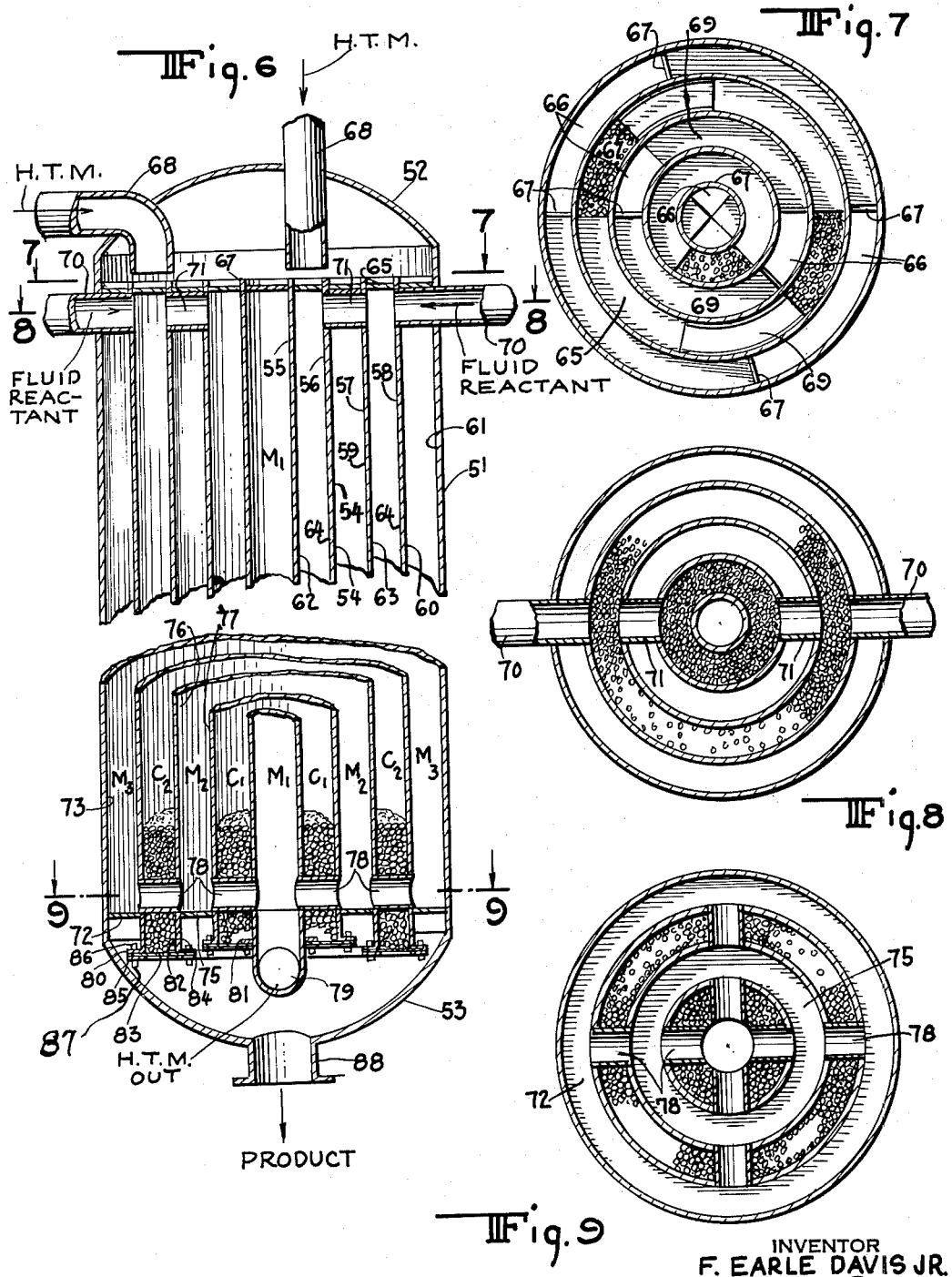

March 31, 1964 F. E. DAVIS, JR 3,127,247
ALTERNATE ANNULAR ISOTHERMAL REACTOR
Filed April 22, 1960 7 Sheets-Sheet 4
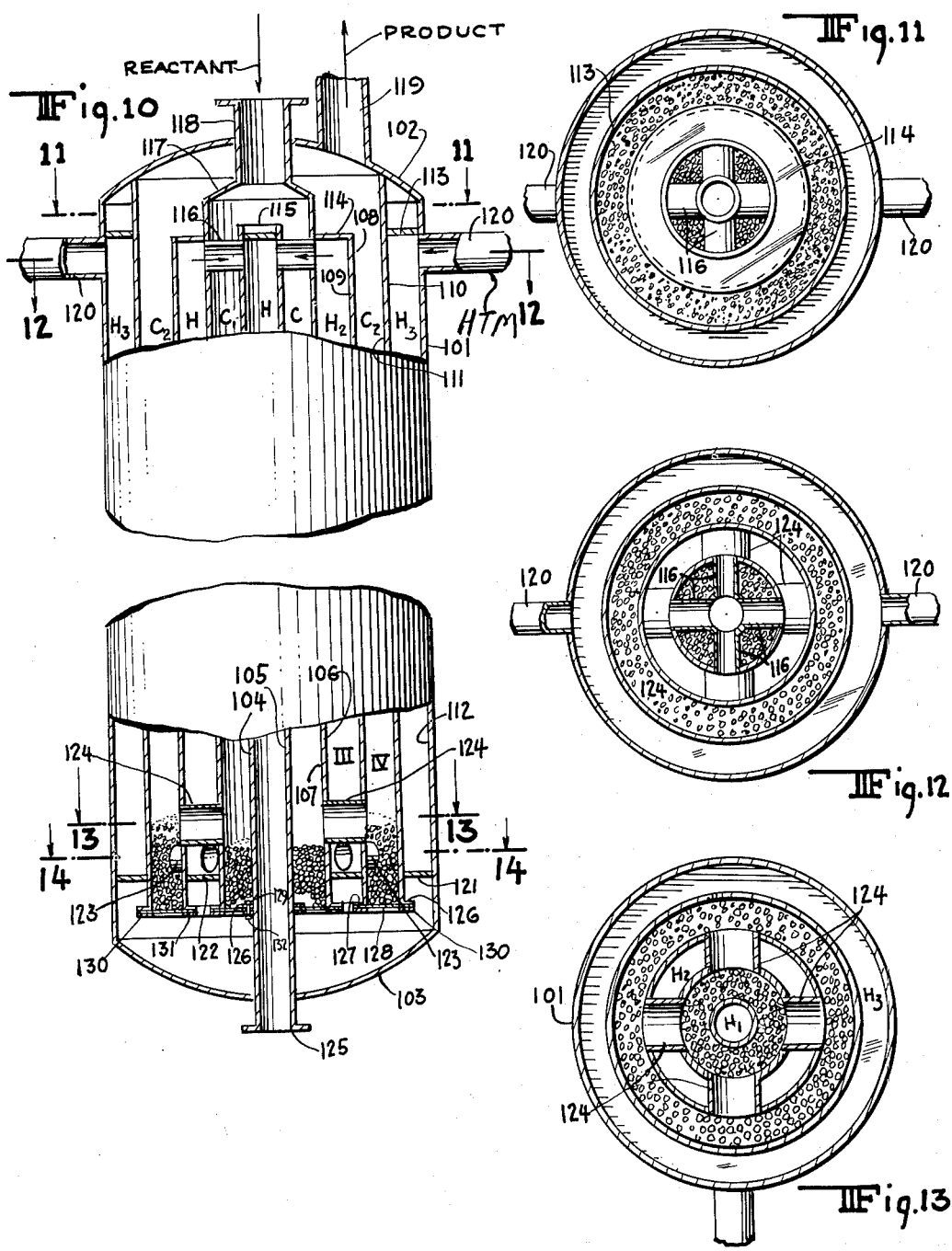

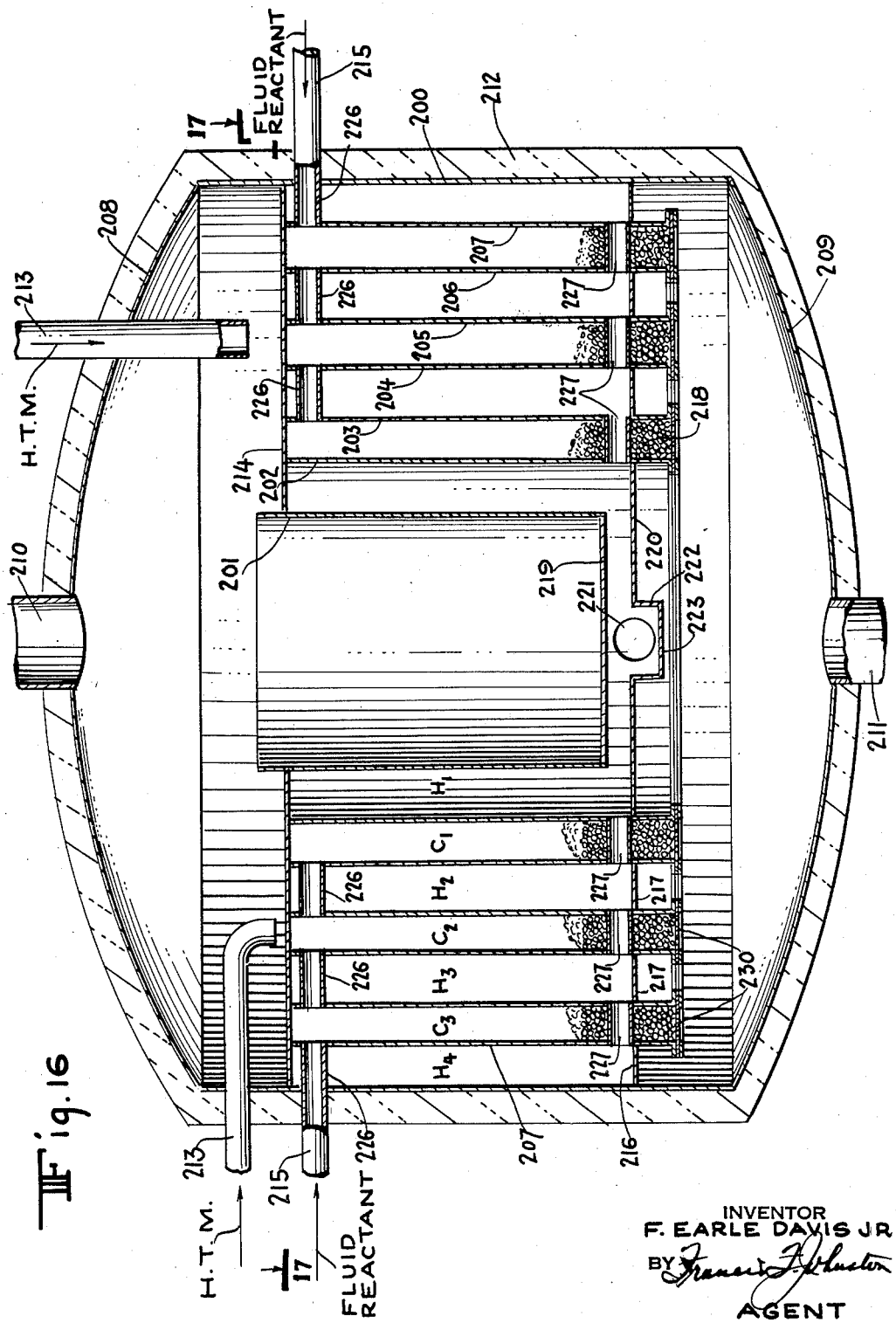

March 31, 1964 F. E. DAVIS, JR 3,127,247
ALTERNATE ANNULAR ISOTHERMAL REACTOR
Filed April 22, 1960 7 Sheets-Sheet 6

INVENTOR
F. EARLE DAVIS JR.
BY
AGENT

March 31, 1964    F. E. DAVIS, JR    3,127,247
ALTERNATE ANNULAR ISOTHERMAL REACTOR
Filed April 22, 1960    7 Sheets-Sheet 7

INVENTOR
F. EARLE DAVIS JR.
BY
AGENT

United States Patent Office 3,127,247
Patented Mar. 31, 1964

3,127,247
ALTERNATE ANNULAR ISOTHERMAL REACTOR
Francis Earle Davis, Jr., Westville, N.J. (% Socony Mobil Oil Company, Inc., Research Laboratories, Paulsboro, N.J.)
Filed Apr. 22, 1960, Ser. No. 23,972
7 Claims. (Cl. 23—288)

The present invention relates to isothermal or pseudo-isothermal reactors for catalytic conversion of fluid reactant and, more particularly, to an isothermal or pseudo-isothermal reactor for endothermic catalytic conversions of fluid hydrocarbons. The present invention provides an isothermal or pseudoisothermal reactor having a central flowing annular or cylindrical pool of heat transfer medium and substantially concentric annular static beds of particle-form solid catalytic material alternating with annular flowing pools of heat transfer medium. The flow of heat transfer medium can be uni-directional, i.e., parallel flow, or bi-directional, i.e., series flow through the annular pools of heat transfer medium. The flow of heat transfer medium in unidirectional flow can be concurrent or countercurrent to the directon of flow of the fluid reactants through the annular beds of particle-form solid catalytic material.

The present reactor has the virtue of simplicity of design coupled with facile operations. The present reactor solves the problem of supplying or removing the heat representing a change in temperature of upwards of 80° F. in a unit the fabrication of which is not fraught with the problems of earlier isothermal or pseudo-isothermal reactors. Accordingly, it is an object of the present invention to provide an isothermal or pseudo-isothermal reactor for catalytic conversions of fluid reactants in which the heat to be supplied or removed is represented by a change in temperature of upwards of 80° F. It is another object of the present invention to provide an isothermal or pseudo-isothermal reactor in which the width of the catalyst bed between the contacting walls of the heat transfer medium annuli is not greater than about four inches and the difference between the temperature of the heat transfer medium and the point in the catalyst bed furtherest from the walls of the heat transfer medium annuli is not greater than about 20° F. It is a further object of the present invention to provide an isothermal or pseudo-isothermal reactor for catalytic conversions of fluid reactants having a central flowing column or annulus of heat transfer medium, an outer annulus of flowing heat transfer medium and static annular beds of particle-form solid catalytic material alternating with flowing annuli of heat transfer medium between said central column or annulus of flowing heat transfer medium and the said outer annulus of flowing heat transfer medium. It is also an object of the present invention to provide an isothermal or pseudo-isothermal reactor for catalytic conversions of fluid reactants in which the outer walls of adjacent annuli confining static bed of particle-form, solid catalytic material confine flowing annular pools of heat transfer medium. The present invention has as a specific object provision of an isothermal or pseudo-isothermal reactor for reforming naphtha to raise the octane rating thereof. Other objects and advantages of the present invention will become apparent from the following description thereof taken in conjunction with the drawings in which FIGURE 1 is a vertical section of an isothermal or pseudo-isothermal reactor for catalytic conversion of fluid reactants constructed and arranged for parallel flow of heat transfer medium downwardly through a plurality of substantially concentric annuli with concurrent flow of fluid reactants downwardly through annular static beds of particle-form solid catalytic material;

FIGURE 2 is a horizontal cross-section of the isothermal or pseudo-isothermal reactor taken at line 2—2 in FIGURE 1;

FIGURE 3 is a horizontal cross-section of the isothermal or pseudo-isothermal reactor taken at line 3—3 in FIGURE 1;

FIGURE 4 is a vertical section of the lower portion of the alternate annuli of flowing pools of heat transfer medium and static particle-form solid catalytic material showing a method of mounting the bottom plate of the heat transfer medium annuli on angles mounted on the outer peripheries of the annular walls confining the beds of static particle-form solid catalytic material;

FIGURE 5 is a plan view of the bottom of an annulus confining a static bed of particle-form solid catalytic material showing the foraminous plate forming the bottom thereof shown in cross-section in FIGURE 4;

FIGURE 6 is a vertical section of an isothermal or pseudo-isothermal reactor constructed in accordance with the principles of the present invention illustrating means of introducting and withdrawing heat transfer medium and introducing fluid reactant and withdrawing fluid products which is an alternative to that shown in FIGURE 1;

FIGURE 7 is a horizontal section taken at 7—7 in FIGURE 6;

FIGURE 8 is a horizontal section taken at 8—8 in FIGURE 6;

FIGURE 9 is a horizontal section taken at 9—9 in FIGURE 6;

FIGURE 10 is a vertical section of an isothermal or pseudo-isothermal reactor of the present invention for catalytic conversions of fluid reactants having alternate pools of flowing heat transfer medium and static beds of particle-form solid catalytic material in which the heat transfer medium flows in series from the outer pool of heat transfer medium through the intervening pools of heat transfer medium to a central cylindrical column of flowing heat transfer medium and in which the fluid reactants flow in series through the annular beds of particle-form solid catalytic material;

FIGURE 11 is a horizontal cross-section of the isothermal or pseudo-isothermal reactor of FIGURE 10 taken at line 11—11;

FIGURE 12 is a horizontal cross-section of the isothermal or pseudo-isothermal reactor of FIGURE 10 taken at line 12—12;

FIGURE 13 is a horizontal cross-section of the isothermal or pseudo-isothermal reactor of FIGURE 10 taken at line 13—13;

FIGURE 14 is a horizontal cross-section of the isothermal or pheudo-isothermal reactor of FIGURE 10 taken at line 14—14;

FIGURE 15 is a vertical view of sections of annuli showing the heat transfer medium tunnels in a pair of annular walls and fluid reactant tunnels in a pair of annular walls.

FIGURE 16 is a vertical section of an isothermal or pseudo-isothermal reactor of the present invention for catalytic conversions of fluid reactants having alternate annular pools of heat transfer material and static beds of particle-form solid catalytic material in which the heat transfer medium flows in parallel downwardly through the several annular pools thereof to a central outlet while the fluid reactant flows downwardly in parallel through the several annular beds of particle-form solid catalytic material to a central outlet.

Figure 17:
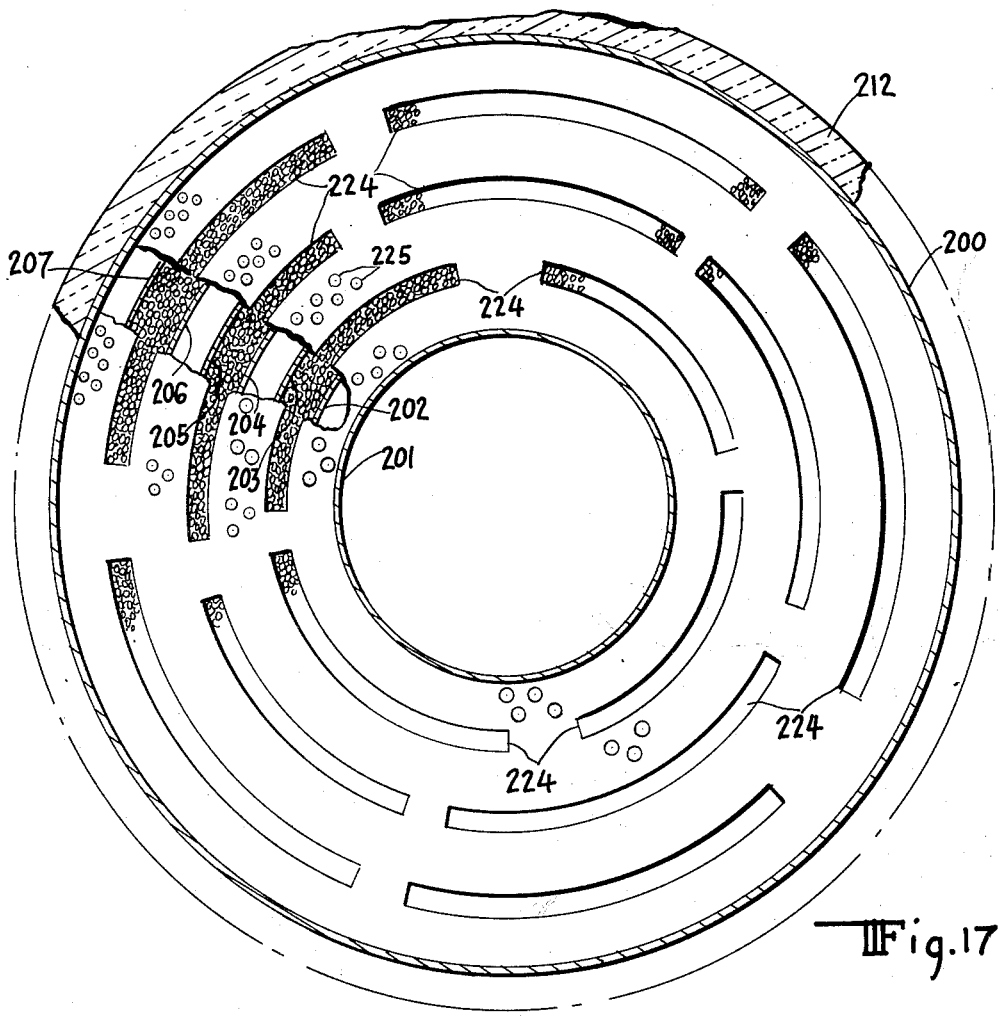
Figure 18:
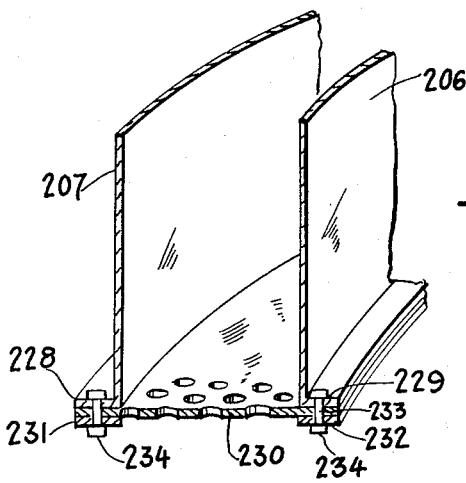

FIGURE 17 is a horizontal cross-section taken at line 17—17 in FIGURE 16;

FIGURE 18 is a horizontal cross-section of an annular bed of particle-form solid catalytic material showing the bed of inerts and the mounting of the perforated bottom of the annular catalyst chamber.

Figure 19:
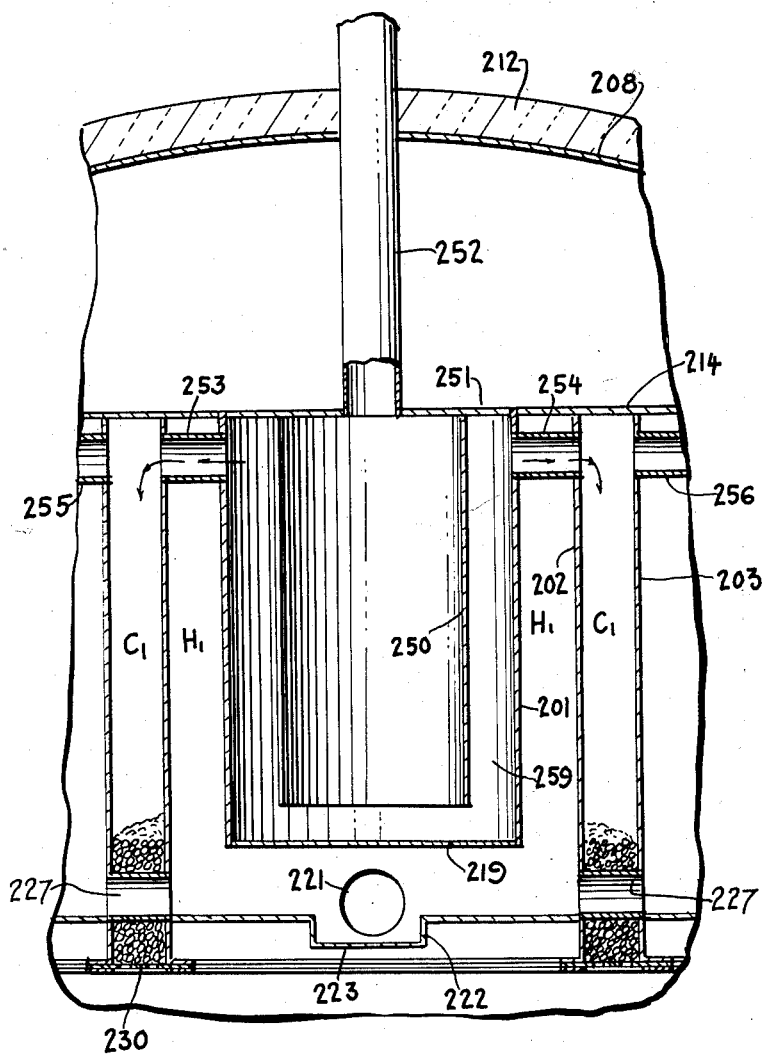

FIGURE 19 is a vertical section of an isothermal or pseudo-isothermal reactor such as illustrated in FIGURE 16 modified to provide for heat exchange between the hot heat exchange medium in the innermost heat exchange medium jacket and the fluid reactant to provide the final input of heat energy to raise the temperature of the heated fluid reactant to reaction temperature.

It will be recognized by those skilled in the art that the number of annuli in the isothermal or pseudo-isothermal reactor is limited by the strength of materials involved and/or by the pressure drop between the inlet and the outlet for the heat transfer medium. However, the width of the catalyst bed within the catalyst annuli is limited by the coefficient of heat transfer of the material which is the major constituent of the catalytic material. For most catalytic materials having silica or alumina or silica-alumina or other refractory oxide as the support or for catalytic material such as clay or silica-alumina the distance between the walls of the annuli confining the bed of catalytic material is not more than about four inches. The width of the bed of catalytic material or the distance between the inner walls of annuli confining the catalytic material can be calculated from the following data available in various handbooks such as Perry's "Chemical Engineers' Handbook" (McGraw-Hill Pub. Co.).

The width of the bed of particle-form solid catalytic material, i.e., $R_4-R_3$, $R_2-R_1$ in FIGURE 2 where $R_4$ is the radius of the fourth cylinder, $R_3$ is the radius of the third cylinder, $R_2$ is the radius of the second cylinder, and $R_1$ is the radius of the first or innermost cylinder depends upon the rate at which the fluid reactant is fed to the reactor in pounds per hour (B), operating liquid hourly space velocity (LHSV), depth of the concentric annuli (L), and the locally limiting factor (1) maximum desired temperature drop across the catalyst bed from the wall of the catalyst chamber to the horizontal center of the catalyst bed, or (2) the maximum pressure through the catalyst bed, or (3) the maximum pressure drop through the heat transfer medium annuli, or (4) the maximum number of annuli selected, stated mathematically, the bed width $R_4-R_3$, and $R_2-R_1$, or $W=$ a function of B, LHSV, L and $\Delta T$ maximum, or $\Delta P$ maximum, or $\Delta N$ maximum where T is degrees Fahrenheit, P is pounds per square inch, and N is the limiting number of annuli.

CASE I (Assuming that the temperature difference between the catalyst in the horizontal center of any annulus and the catalyst at the wall of the annulus is the limiting factor) the width of the bed is calculated from the following equation as outlined in Perry's "Chemical Engineers' Handbook," 3rd Edition, page 464.

(Equation I)

$$Q = UA\Delta T = \frac{\Delta T}{1/UA} = \frac{\text{driving force}}{\text{resistance}}$$

$$Q = \frac{\Delta T}{\frac{1}{h_m A_m} + \frac{X_w}{K_w A_w} + \frac{1}{h_h A_h} + \frac{X_c}{K_c A_c}}$$

The foregoing equation states that the rate of heat transfer, Q, is equal to the driving force, $\Delta T$, divided by the resistance of the heat transfer medium m, cylinder wall w, hydrocarbon vapors h, and catalyst c.

The $h$'s and $K$'s in the foregoing equation are, respectively, heat transfer coefficients and thermal conductivities of the indicated materials. These values can be obtained from the literature or determined experimentally in known manner. The values $X_w$ and $A_w$ are fixed by the dimensions of the HTM annuli. X is the distance in the direction of heat transfer while A is the area perpendicular to the direction of heat transfer. Since for a given vertical section (L) of a reactor there will be a corresponding (Q), all of the terms of the equation are known except the area term $A_c$ and the distance $X_c$. In the case of concentric annuli $A = 2\Pi r_m L$, where $r_m$ is the logarithmic mean radius of all of the catalyst annuli. Hence $$r_m = \frac{r_2 - r_1}{\ln \frac{r_2}{r_1}} \text{ or } \frac{r_4 - r_3}{\ln \frac{r_4}{r_3}}$$

Since L is known, the equation can be solved for $r_m$ after assigning a value to $X_c$. It is to be noted that $X_c$ and $r_m$ are inter-related. (When the calculated $r_m$ and the resulting $X_c$ are in agreement with the assigned $X_c$, the equation has been solved correctly.)

In many cases the resistance term, $$\frac{X_c}{K_c A_c}$$

in Equation 1 is negligible in comparison to the other resistances and can be ignored. In such instances $r_m$ and subsequently $r_2 - r_1$, the horizontal width of the catalyst bed, can be calculated directly.

CASE II (Assuming the pressure drop of the hydrocarbon vapors through the catalyst annuli is the limiting factor.) For a packed catalyst bed the modified form the Fanning equation as given in Perry's "Chemical Engineers' Handbook," 3rd Edition, page 393 is used. This equation follows:

(2) $$\Delta P = \frac{4fL\rho V_0^2 A_f}{2g_c D_p}$$

$$N_{Re} = \frac{D_p V_0 \rho}{\mu}$$

where $\Delta P =$ pressure drop in pounds per square foot;
$\mu =$ viscosity of hydrocarbon vapors in pounds per foot-second;
$L =$ depth of bed in feet;
$\rho =$ density of hydrocarbon vapors in pounds per cubic foot;
$V_0 =$ velocity of vapors in feet per second based on the empty cross-section;
$D_p =$ nominal diameter of catalyst in feet;
$g_c =$ conversion factor or 32.2 pound foot per pound second squared, i.e., 32.2 lb. ft./lb. sec.²;
$f =$ modified friction factor (dimensionless);
$A_f =$ wall effect factor (dimensionless).

The friction factor $f$ is determined from the correlation thereof with the Reynolds number, $N_{Re}$. All of the other terms in Equation 2 are known except $V_0$ and $A_f$, which are inter-related. Therefore, a value for $A_f$ is assigned to the outside concentric cylinder to obtain the catalyst bed thickness. Then the calculated $A_f$ must agree with that predicted from the ratio of the particle diameter to the tube diameter, i.e., annulus diameter, as outlined in "Chemical Engineers' Handbook," J. H. Perry, 3d Ed., p. 393 (McGraw-Hill Book Co., 1950).

CASE IIA

In some cases the width of the catalyst bed in an isothermal or pseudo-isothermal reactor can be determined indirectly by the pressure drop across the heat transfer medium annuli. When the amount of heat transfer medium (HTM) flowing through the HTM annuli is limited by the pressure drop thereof, the width of the catalyst bed is reduced to ensure isothermicity or pseudo-isothermicity.

The width of the HTM annuli can be calculated from the Fanning equation.

(3) $$\Delta P = \frac{4fV^2\rho L}{D(2g)(144)} = \frac{1.343 fLW^2}{10^5 \rho d^5}$$

where $\Delta P$=pressure drop in pounds per square inch;
$f$=friction factor (dimensionless);
$L$=length in feet;
$d$=inside diameter of pipe in inches;
$D$=inside diameter of pipe in feet;
$\rho$=density in pounds per cubic foot;
$g$=gravitational constant, 32.2 feet per second squared;
$W$=flow rate in pounds per hour.
$V$=average velocity in feet per second.

In the case of concentric cylinders an equivalent diameter is used. The equivalent diameter is equal to four times the hydraulic radius, $4R_H$, or $$\frac{4 \times \text{area of cross-section of the stream}}{\text{The wetted perimeter}}$$

In the case of concentric cylinders the equivalent diameter is equal to the outside diameters minus the inside diameters of the annuli. Therefore, a value is assigned to the diameter of the outer cylinder and, using the equivalent diameter, the friction factor is obtained from its correlation with the "Reynolds number." Then the value of $D$ or $d$ is calculated from Equation 3, and the calculation repeated until both the assigned diameters and the calculated $D$'s agree.

CASE III (Assuming the number of annuli is limiting.) For a given space velocity and limiting number of annuli, the length of the reactor and the width of the catalyst bed can be varied to give the desired space velocity.

In general, usually the controlling factor of the width of the catalyst bed is the permissible or tolerable maximum temperature difference between the temperature of the catalyst chamber adjacent to the HTM annulus and that at the horizontal center of the catalyst bed. However, the pressure drop through the catalyst annuli can also be a limiting factor in determining the width of the catalyst bed or annulus. For example, when the aforesaid permissible or tolerable maximum temperature difference is not more than 25° F. or the aforesaid maximum pressure drop through the catalyst annuli is not more than 100 p.s.i. (pounds per square inch) at a nominal reaction pressure of 500 p.s.i.g., and not more than 50 p.s.i. for a reaction pressure of 200 p.s.i.g., either of these limiting factors control the width of the catalyst bed.

Example I (Assume inside diameter of central HTM cylinder=8 inches and that cylinder wall thickness is ¼ inch.) Then the outside diameter of the contiguous catalyst chamber=

$$4\frac{1}{4}'' \text{ I.D.} \times 8\frac{1}{4}'' \text{ I.D.} = 8\frac{1}{2}'' \text{ O.D.}$$

$$V_1 = \Pi(r_2^2 - r_1^2)h = \Pi\left[\left(\frac{8.25}{12}\right)^2 - \left(\frac{4.25}{12}\right)^2\right]h \text{ ft.}^3$$

$$= \Pi(0.472 - 0.125)h = 1.09h \text{ ft.}^3$$

$$V_2 = \Pi(r_4^2 - r_3^2)h$$

$$= \Pi\left[\left(\frac{16.75}{12}\right)^2 - \left(\frac{12.75}{12}\right)^2\right]h \text{ ft.}^3$$

$$= (1.95 - 1.13)h = 2.58h \text{ ft.}^3$$

$$V_3 = \Pi(r_6^2 - r_5^2)h$$

$$= \Pi\left[\left(\frac{25.25}{12}\right)^2 - \left(\frac{21.25}{12}\right)^2\right]h \text{ ft.}^3$$

$$= \Pi[4.44 - 3.14]h \text{ ft.}^3$$

$$= 4.21h \text{ ft.}^3$$

$$V_4 = \Pi(r_8^2 - r_7^2)h$$

$$= \Pi\left[\left(\frac{33.75}{12}\right)^2 - \left(\frac{29.75}{12}\right)^2\right]h \text{ ft.}^3$$

$$= \Pi[7.90 - 6.13]h \text{ ft.}^3$$

$$= 5.57h \text{ ft.}^3$$

For a reactor having a capacity of 10,000 b./s.d. (barrels per stream day) at a liquid hourly space velocity (LHSV) of 15, i.e., 15 barrels of liquid per barrel of catalyst per hour, $$10,000 \text{ b./sd.} = 417 \text{ b./hr.}$$

$$\frac{417 \text{ b./hr.}}{15} \times 5.6 \text{ ft.}^3/\text{b.}$$

$$= 155.7 \text{ ft.}^3 \text{ of catalyst required in reactor}$$

$$1.09h + 2.58h + 4.21h + 5.57h = 155.7$$

$$13.45h = 155.7$$

$$h = 11.53 \text{ ft.}$$

$$= 138 \text{ inches}$$

CASE IV

Assuming that the inside diameter of a reactor shell is four feet; that the annular reaction zones and the heat transfer medium zones are four inches wide; that the walls of the reaction zones and the heat transfer medium zones are 0.25 inch thick; how deep is the catalyst bed?

$$V_1 = \Pi(r_o^2 - r_i^2)h \text{ ft.} = \Pi\left[\left(\frac{32.25}{12}\right)^2 - \left(\frac{28.25}{12}\right)^2\right]h \text{ ft.}^3$$

$$= \Pi(7.24 - 5.54)h \text{ ft.}^3 = 5.35h \text{ ft.}^3$$

$$V_2 = \Pi\left[\left(\frac{40.75}{12}\right)^2 - \left(\frac{36.75}{12}\right)^2\right]h \text{ ft.}^3$$

$$= \Pi(11.54 - 9.36)h \text{ ft.}^3 = 6.85h \text{ ft.}^3$$

$$V_3 = \Pi\left[\left(\frac{49.25}{14}\right)^2 - \left(\frac{45.25}{12}\right)^2\right]h \text{ ft.}^3$$

$$= \Pi(16.85 - 14.18)h \text{ ft.}^3 = 8.40h \text{ ft.}^3$$

$$V_4 = \Pi\left[\left(\frac{57.75}{12}\right)^2 - \left(\frac{53.75}{12}\right)^2\right]h \text{ ft.}^3$$

$$= \Pi(23.14 - 20.05)h \text{ ft.}^3 = 9.71h \text{ ft.}^3$$

For a reactor having a capacity of 10,000 b./s.d. (barrels per stream day) at a liquid hourly space velocity (LHSV) of 1

$$\frac{10,000}{24} = 417 \text{ b./hr.}$$

$$\frac{417 \text{ b./hr.}}{1} \times 5.6 \text{ ft.}^3/\text{b.} = 2336 \text{ ft.}^3$$

$$5.35h + 6.85h + 8.40h + 9.71h = 2336 \text{ ft.}^3$$

$$30.31h = 2336 \text{ ft.}^3$$

$$h = 77 \text{ ft.} - 924 \text{ inches}$$

For a parallel flow of fluid reactant through the annular beds of catalyst in Case II the catalyst and the fluid reactant are distributed among the four catalyst zones in the proportions set forth in the following tabulation:

| Reaction Zone No. | Barrels of Catalyst | Barrels of Fluid Reactant per Hour | LHSV |
|---|---|---|---|
| $C_1$ | 74 | 74 | 1.0 |
| $C_2$ | 94 | 94 | 1.0 |
| $C_3$ | 115 | 115 | 1.0 |
| $C_4$ | 133 | 133 | 1.0 |

As those skilled in the art will understand the width of the heat transfer medium annuli can be the same as or different from the width of the annular catalyst zones.

The heat transfer medium is a fluid; for example, gases from the combustion of liquid, solid, or gaseous fuel, hydrocarbon liquid having a decomposition temperature above the reaction temperature of the reaction to which heat is supplied, for example "Dowtherm," or a mixture of inorganic salts such as well-known mixtures of the nitrites and nitrates of sodium which is molten at the temperature of the reaction to which heat is to be supplied.

In general, the isothermal or pseudo-isothermal reactor for catalytic conversion of fluid reactants which is the subject of the present invention comprises a cylindrical tank having an upper head and a lower head, a plurality of cylinders having substantially impervious walls mounted concentric with the vertical axis of the aforesaid cylindrical tank and in mutually spaced apart relation. The outermost cylinder, i.e., the cylinder adjacent the wall of said cylindrical tank, of the aforesaid plurality of cylinders being also spaced apart from the wall of the aforesaid cylindrical tank. All of the aforesaid cylinders are rigidly mounted in spaced relation with the upper and lower heads of said cylindrical tank. When the central cylinder of the aforesaid plurality of concentric cylinders has a relatively small diameter of 4 to 20 inches, as illustrated in FIGURES 1 through 15, it is the first and central heat transfer medium chamber. The outer peripheries of the even numbered cylinders and the inner peripheries of the odd number cylinders (the central cylinder being cylinder number 1), and the outer periphery of the outermost cylinder, i.e., the cylinder adjacent the wall of the aforesaid tank, and the inner periphery of the wall of the aforesaid cylindrical tank being the vertical walls of a plurality of annular heat transfer medium chambers. The outer peripheries of the odd numbered cylinders and the inner peripheries of the even numbered cylinders being the vertical walls of a plurality of annular catalyst chambers. However, it is preferred to construct the "isothermal" or pseudo-isothermal reactor of the present invention of a plurality of concentric cylinders of which the central or number 1 cylinder has a diameter of at least 3 feet and a maximum diameter of not more than 15 feet. In this construction the central or number 1 cylinder is not a heat transfer medium chamber. The innermost annular chamber, i.e., the space between the outer periphery of the number 1 cylinder and the inner periphery of the number 2 cylinder being the innermost heat transfer medium chamber. In this construction the outer peripheries of the odd numbered cylinders and the inner peripheries of the even numbered cylinders, and the outer periphery of the outermost cylinder and the inner periphery of the shell are the vertical walls of a plurality of concentric annular heat transfer medium chambers or jackets while the outer peripheries of the even numbered cylinders and the inner peripheries of the odd numbered cylinders are the vertical walls of a plurality of concentric annular catalyst chambers or reaction zones. The aforesaid plurality of cylinders is constructed and arranged (1) for parallel flow of heat transfer medium through all of the heat transfer medium chambers with the heat transfer medium introduced and withdrawn through the side of the cylindrical tank, (2) for parallel flow of heat transfer medium through all of the heat transfer medium chambers with heat transfer medium introduced through the upper head and withdrawn from the lower portion of the first central cylindrical heat transfer medium chamber, and (3) for series flow of heat transfer medium from the outermost annular heat transfer medium chamber to the first central cylindrical heat transfer medium chamber through the interposed annular heat transfer medium chambers. The aforesaid plurality of cylinders is constructed and arranged (1) for parallel flow of fluid reactant through all of the plurality of annular catalyst chambers with introduction of fluid reactant and withdrawal of fluid product through the heads of said cylindrical tank, (2) for parallel flow of fluid reactant through all of the plurality of annular catalyst chambers with introduction of the fluid reactant through the side of said cylindrical tank and withdrawal of fluid product through a head of said cylindrical tank, and (3) for series flow of fluid reactant through the annular catalyst chambers with introduction of fluid reactant and withdrawal of fluid product through the heads of said cylindrical tank.

For a more detailed description of the present isothermal or pseudo-isothermal reactor reference is first made to the embodiment illustrated in FIGURES 1 through 5 in which the cylinders are constructed and arranged for parallel flow of heat transfer medium through the first central cylindrical heat transfer chamber and the annular heat transfer medium chambers with the heat transfer medium introduced and withdrawn through the side of the cylindrical tank. In the illustrated embodiment (FIGURES 1 through 5) the fluid reactant is introduced through the upper head, flows in parallel through the plurality of concentric catalyst chambers or reaction zones, and is withdrawn through the lower head of the cylindrical tank.

In FIGURE 1 there is illustrated a cylindrical tank 1 having an upper head 2 and a lower head 3. A fluid reactant inlet 4 is mounted in the upper head preferably concentric with the vertical axis of the cylindrical tank. A fluid product outlet 5 is mounted in the lower head of the cylindrical tank preferably concentric with the vertical axis of said cylindrical tank.

A first central cylinder 7 is rigidly mounted concentric with the vertical axis of the cylindrical tank and in spaced apart relation with the upper and lower heads of said cylindrical tank. A plurality of concentric cylinders mutually spaced apart with the cylinder adjacent the aforesaid first central cylinder spaced apart therefrom and the outermost cylinder, i.e., the cylinder adjacent the wall of the cylindrical tank (in the illustrative drawing cylinder 10) is spaced apart from the wall of said cylindrical tank. Cylinders 7, 8, 9, and 10 of the aforesaid plurality of cylinders are shown in FIGURES 1 through 5. The aforesaid plurality of mutually spaced apart cylinders are rigidly mounted in spaced apart relation with the upper and lower heads of said cylindrical tank. (It is to be observed that the number of cylinders is not limited to four as illustrated but by other factors such as the required space for catalyst, reactor diameter as limited by the structural strength of the materials employed and the design of supporting members, etc.)

The first central cylinder 7 is a heat transfer medium chamber. The outer periphery of cylinder 10, that is periphery 11, i.e., the outer periphery of the fourth cylinder, with the inner periphery 12 of the cylindrical tank are the vertical walls of a heat transfer medium chamber. Similarly, the outer periphery 13 of cylinder 8, i.e., the second cylinder, and the inner periphery 14 of cylinder 9, i.e., the third cylinder, are the vertical walls of a heat transfer medium chamber. In other words, in this construction the first central cylinder 7 forms a cylindrical heat transfer medium chamber and the outer peripheries of the even numbered cylinders and the inner peripheries of the odd numbered cylinders together with the outer periphery of the outermost cylinder or the cylinder adjacent the cylindrical tank and the inner periphery of the reactor shell are the vertical walls of a plurality of annular heat transfer medium chambers. The vertical walls of the annular particle-form solid catalyst chambers or reaction zones are the outer peripheries of the odd numbered cylinders and the inner peripheries of the even numbered cylinders. Thus, the outer periphery 15 of the first or central cylinder (7) and the inner periphery 16 of the second cylinder (8) are the vertical walls of an annular catalyst chamber or reaction zone. The outer periphery 17 of the third cylinder (9) and the inner periphery 18 of the fourth cylinder (10) are the vertical walls of another catalyst chamber or reaction zone. In FIGURES 1 through 5 the heat transfer medium chambers are indicated from the central cylinder as $H_1$, $H_2$, and $H_3$, respectively. Similarly, the catalyst chambers or reaction zones are labeled $C_1$ and $C_2$, respectively.

In the reactor illustrated in FIGURES 1 through 5 the fluid reactant is introduced into the reactor through reactant inlet 4 to a plenum between the upper head and a horizontal plate rigidly mounted on the inner periphery of the tank having annular openings corresponding to the outer and inner peripheries of the annular catalyst chambers or annular plates are rigidly mounted horizontally in a fluid reactant tight manner between the outer peripheries of the odd numbered cylinders and the inner peripheries of the even numbered cylinders, and between the outer periphery of the outermost cylinder, i.e., the cylinder adjacent the wall of the cylindrical tank, and the inner periphery of the wall of the cylindrical tank in the region of the top of peripheries of the cylinders. Preferably, all of the aforesaid annular plates are in the same horizontal plane. The single horizontal plate or the plurality of annular plates preferably are mounted in a fluid-reactant tight manner by welding. When a plurality of annular plates is employed to seal the heat transfer medium from the incoming fluid-reactant and from the tops of the heat transfer medium chambers, a circular plate is rigidly mounted horizontally in a fluid-reactant tight manner within the first central cylinder in the plane of the annular plates. In the illustrative drawing FIGURE 1 the annular plates are designated 19 and 20 and the circular plate mounted in the first or central cylinder is numbered 21.

Spaced downwardly from the aforesaid annular plates, i.e., first uper annular plates, in each heat transfer medium chamber are second upper annular plates 22, and 23, each of which is perforated for passage of heat transfer medium into the subtended heat transfer medium chamber. The perforations 48 in the second upper annular plate in the outermost annular heat transfer medium chamber and the perforations or heat transfer medium chamber inlets in the other heat transfer medium chambers differ in size and/or number to regulate the flow of heat transfer medium to each heat transfer medium chamber to ensure that the flow of heat transfer medium to each annular heat transfer medium chamber is uniform. Generally, the perforations and/or the number thereof in each of the aforesaid second annular plates increase from the outer annular heat transfer medium chamber to the innermost annular heat transfer medium chamber. Thus, perforations 49 (FIG. 3) are greater in number and/or diameter thereof than perforations 48.

At least one port is provided in each cylinder other than the central cylinder and at least two ports are provided in the central cylinder having the horizontal axis thereof an extension of the horizontal axis of the passages formed by the hereinbefore identified first and second upper annular plates.

At least two conduits 24 and 25 are rigidly mounted horizontally in each annular catalyst chamber in a heat transfer medium- and fluid reactant-tight manner with the horizontal axis thereof concentric with horizontal axes of the ports in the adjacent cylinder walls.

The first upper annular plates and the second upper annular plates, the ports in the cylinder walls and the conduits in the catalyst chambers being constructed and arranged for uniform flow of heat transfer medium to each heat transfer medium chamber. At least one heat transfer medium inlet is rigidly mounted in a heat transfer medium-tight manner in the wall of the cylindrical tank in the planes of the first and second upper annular plates constructed and arranged for introducing heat transfer medium into the heat transfer medium chambers.

The isothermal or pseudo-isothermal reactor illustrated in FIGURES 1 through 5 provides for withdrawal of heat transfer medium through the wall of the tank from the outer heat transfer medium chamber, i.e., the heat transfer medium chamber adjacent the tank wall through at least one heat transfer medium outlet 29. Accordingly, a first lower annular plate 30 is rigidly mounted in a heat transfer medium-tight manner on the inner periphery of the wall of the cylindrical tank and on the outer periphery of the outermost cylinder, i.e., the cylinder adjacent to the tank wall in the horizontal plane of the lowest portion of the periphery of outlet 29. A similar first lower annular plate 31 is mounted in a heat transfer medium-tight manner in the horizontal plane of plate 30 on the inner periphery of each odd numbered cylinder except the first central cylinder and on the outer peripheries of each even numbered cylinder. Each cylinder is provided with at least two lower ports the horizontal axes of which are in the plane of the horizontal axis of heat transfer medium outlet 29.

At least two horizontal conduits 32, 33, 34 and 35 are rigidly mounted in a heat transfer medium- and fluid reactant-tight manner in each catalyst chamber concentric with the aforesaid lower ports in the cylinders forming the walls of the catalyst chamber.

The first or central cylinder is provided with a lower circular plate 36 rigidly mounted on the inner periphery thereof in the plane of the lower plates 30 and 31 and the bottoms of conduits 32, 33, 34 and 35.

The aforesaid heat transfer medium outlet, said first lower annular plates and said conduits being constructed and arranged for the flow of heat transfer medium from the bottoms of all of the heat transfer medium chambers to said heat transfer medium outlet. Accordingly, as illustrated in FIGURES 1 through 5 the flow of liquid heat transfer medium is as follows: Liquid heat transfer medium at a temperature about 25° F. above the temperature to be maintained in the annular reaction zones is introduced through heat transfer medium inlet 28 onto second upper perforated plate 22. The heat transfer medium flows over annular plate 22 and through the perforations therein and through conduit 24 to perforated annular plate 23. The heat transfer medium flows through and over perforated annular plate 23 to conduit 25. The heat transfer medium flows through conduit 25 to first and central cylinder 7. Heat transfer medium flows into the respective heat transfer medium chambers until each chamber is filled with heat transfer medium to the level of the perforated plates 22 and 23. A valve (not shown) in outlet 29 is then opened or the suction of the heat transfer medium pump (not shown) drawing the heat transfer medium from the reactor and delivering it to means for heating the heat transfer medium to the required temperature is opened and the heat transfer medium flows from inlet 28 through heat transfer medium conduits 24, 25, 26 and 27 to heat transfer medium chambers 37, 38 and 39 in parallel to heat transfer medium conduits 32, 33, 34, and 35 to heat transfer medium outlet 29 and back to means for heating the liquid heat transfer medium to a temperature about 25° F. above the temperature to be maintained in the annular reaction zones.

The annular catalyst chambers have annular perforated bottoms. Preferably for the purpose of removing catalyst when necessary or desirable the annular perforated bottoms comprise a plurality of segments of the annulus. The central cylinder and each of the odd numbered cylinders is provided with an inwardly projecting flange 40. Each of the even numbered cylinders is provided with an outwardly projecting flange 41. All of the aforesaid flanges are at the bottoms of the respective cylinders and below the plane of the lower plates 30, 31 and 36. Each of the aforesaid flanges is perforated for the insertion of bolts at spaced intervals. Segments of a perforated annular plate, for example, 42, 43 and 44 (FIGURE 5) are movably mounted as by bolts 45 against the lower surfaces of flanges 40 and 41. An annular band 46 is mounted below the segments of the perforated annular plate and the segments of the perforated annular plate drawn up by nuts 47 to provide a substantial catalyst-tight structure forming the bottoms of the annular catalyst chamber.

It is preferred to place several layers of pellets of reaction inert material within the catalyst chamber or reaction zone on the aforesaid perforated annular plate or segments thereof to separate any solid particles from the fluid reaction products. Preferably, the pellets are of graduated size varying from pellets three-fourths of an inch in diameter to fragments about one-fourth inch in diameter. The largest pellets are placed at the bottom of the catalyst chamber or reaction zone and the smallest fragments at the top of the layer of units.

The flow of fluid reactant is as follows:

The fluid reactant flows into the reactor through inlet 4. It is preferred to baffle the reactant inlet in any suitable manner to change the direction of flow of the liquid reactant. A suitable baffle is shown in U.S. Patent No. 2,884,372, issued April 28, 1959, in the name of Eric V. Bergstrom. The fluid reactant flows downwardly in parallel through a plurality of annular catalyst chambers or reaction zones of which two, viz. 48 and 49, are shown. The reaction products flow from annular reaction zones 48 and 49 into the plenum at the bottom of the reactor and thence to product outlet 5. From product outlet 5 the product stream flows to means of recovering the valuable constituents of the product stream and, when desirable, recycle of a part of the product stream to the reactant inlet 4.

Those skilled in the art will recognize that the heat transfer medium can supply heat to an endothermic reaction or withdraw heat from an exothermic reaction. Thus, for example in the dehydrogenation of naphthenes, a highly endothermic reaction, the heat transfer medium can supply heat required for the endothermic reaction. When it is necessary to burn-off the coke deposited on the catalyst during the dehydrogenation of the naphthenes the heat transfer medium can be used to withdraw heat produced by the exothermic reaction of the oxidation of the carbonaceous coke.

The isothermal or pseudo-isothermal reactor illustrated in FIGURES 6 through 10 likewise is constructed for parallel flow of heat transfer medium through a plurality of heat transfer medium chambers and for parallel flow of fluid reactant through a plurality of catalyst chambers or reaction zones.

Thus, a vertical cylindrical tank 51 having an upper head 52 and a lower head 53 is provided with a plurality of mutually spaced apart cylinders rigidly mounted concentric with the vertical axis of cylindrical tank 51. Of the plurality of cylinders four, to wit: 55, 56, 57, and 58 are shown. The outermost cylinders, i.e., the cylinder adjacent the wall of cylindrical tank 51, e.g., the fourth cylinder 58 is spaced apart from the wall of the tank.

The first and central cylinder 55 is a heat transfer medium chamber $M_1$. The outer peripheries 54 of the even numbered cylinders (the central cylinder being the first) and the inner peripheries 59 of the odd numbered cylinders, and the outer periphery 60 of the cylinder adjacent the wall of the cylindrical tank, i.e., of the outermost cylinder, and the inner periphery 61 of the wall of the cylindrical tank 51 are the vertical walls of a plurality of annular heat transfer medium chambers, $M_2$ and $M_3$. The outer periphery 62 of the first central cylinder and the outer peripheries 63 of the odd numbered cylinders and the inner peripheries 64 of the even numbered cylinders are the walls of particle-form solid catalyst chambers or reaction zones.

An annular plate 65 the inner diameter of which is only slightly greater than the outer diameter of the first and central cylinder and the outer diameter of which is the same as the inner diameter of cylindrical tank is rigidly mounted horizontally in a heat transfer medium-tight manner on the inner periphery 61 of the wall of cylindrical tank 51 in the region of the top thereof. Annular plate 65 is provided with heat transfer medium ports 66 (FIGURE 7) constructed and arranged for uniform flow of heat transfer medium to each heat transfer medium chamber. A weir 67 is mounted on the perimeter of each of the aforesaid heat transfer medium ports. The area of the heat transfer medium ports and the heights of the aforesaid weirs are regulated to provide flow of heat transfer medium to each transfer medium chamber dependent upon the volume thereof to maintain a substantially uniform temperature in all of the annular reaction zones.

At least one heat transfer medium inlet conduit 68 (two are shown) is rigidly mounted in the upper head 52 of cylindrical tank 51 in spaced relation with the aforesaid horizontal annular plate 65. Heat transfer medium inlet 68 is constructed and arranged to deliver heat transfer medium to the upper surface of annular plate 65. At least one port and heat transfer medium-tight and fluid reactant-tight closure means 69 therefor is constructed and arranged in plate 65 for introducing particle-form solid catalyst into each annular catalyst chamber or reaction zone.

At least one fluid reactant port is provided in the wall of tank 51 and at least one port is provided in the wall of each cylinder except the first central cylinder 55 with the upper portions of said ports slightly below the plane of the lower surface of annular plate 65.

A fluid reactant inlet conduit 70 rigidly mounted in a heat transfer medium-tight and fluid reactant-tight manner in said port in the wall of tank 51 and in the port in the cylinder adjacent to the wall of tank 51. At least two fluid reactant inlet conduits 71 in the plane of the aforesaid fluid reactant inlet conduit 70 rigidly mounted in a heat transfer medium-tight and fluid reactant-tight manner in the ports of the cylinders the walls of which are vertical walls of annular heat transfer medium chambers, said fluid reactant inlet conduits 71 being transverse of each heat transfer medium chamber, said fluid reactant inlet conduits 70 and 71 being constructed and arranged to introduce fluid reactant into each annular reaction zone in a volume to provide a uniform and substantially equal space velocity in all reaction zones. Thus, for a 10,000 barrels per day unit employing a plurality of reactors a single isothermal or pseudo-isothermal reactor having a shell inside diameter of 68 inches, having reaction zones and heat transfer medium zones each 4 inches wide, and having cylinder walls 0.25 inch thick, catalyst beds 140 inches deep in the annular reaction zones, the catalyst charge to the annular catalyst chambers or reaction zones from the central annular reaction zone $C_1$ to the outermost annular reaction zone $C_n$ is indicated in the following table (diameter of central cylinder=8 inches):

TABLE I

| Reaction Zone Number | Barrels of Catalyst [1] | Barrels of Fluid Reactant per Hour | Liquid Hourly Space Velocity, v./hr./v. |
|---|---|---|---|
| $C_1$ | 2.1 | 31 | 15.0 |
| $C_2$ | 5.3 | 80 | 15.0 |
| $C_3$ | 8.7 | 130 | 15.0 |
| $C_n$ | 11.5 | 170 | 15.0 |
| | 27.6 | 411 | |

[1] Catalyst density=pounds per cubic foot, 45.0; 5.6 cubic feet per barrel (42 gallons); $n=4$.

The bottom of each heat transfer medium chamber is a horizontal plate annular in shape. Thus, an annular plate 72 is rigidly mounted horizontally in a heat transfer medium-tight manner on the inner periphery 73 of the wall of cylindrical tank 51 and the outer periphery of the cylinder adjacent to the wall of tank 51. A similar annular plate 75 is rigidly mounted horizontally on the inner periphery 76 of the next cylinder and the outer periphery 77 of the inwardly succeeding cylinder. In other words, an annular plate is mounted on each of the outer peripheries of the even numbered cylinders (the central cylinder being the first cylinder) and on the inner peripheries of the odd numbered cylinders (except the first and central cylinder) in the lower portion thereof.

Each cylinder is provided with a heat transfer medium outlet port with the lower portion of the periphery of the port substantially in the plane of the upper surfaces of the aforesaid annular plates 72 and 75. The central cylinder is provided with two heat transfer medium outlet ports having the horizontal axis of each in the plane of the horizontal axis of the aforesaid heat transfer medium outlet ports. A heat transfer medium conduit 78 is rigidly mounted horizontally in each annular reaction zone in a heat transfer medium-tight and fluid reactant-tight manner in the aforesaid heat transfer medium outlet ports in the walls of the reaction zone.

A heat transfer medium outlet 79 is mounted in the lower head 53 of said cylindrical tank 51 in fluid connection with the first and central cylinder. The heat transfer medium circuit comprises inlet 63, ports 66 in annular plate 65, a plurality of heat transfer medium chambers (of which three $M_1$, $M_2$, and $M_3$ are shown), heat transfer conduits 78 and heat transfer medium outlet 79 constructed and arranged for parallel flow of heat transfer medium through the heat transfer medium chambers to the heat transfer medium outlet at the bottom of the first central cylinder.

The annular catalyst chambers or reaction zones are provided with an annular perforated bottom plate 83 constructed and arranged to support the bed of particle-form solid catalytic material and to separate solids from fluid product. The bottom plate 83 of each annular catalyst chamber or reaction zone advantageously comprises a plurality of segments movably mounted on the bottoms of the walls of the adjacent cylinders which are the walls of the catalyst chambers. In other words, a flange 80 is rigidly mounted on the outer periphery of the even numbered cylinders at the lower end thereof. A flange 81 is also rigidly mounted on the outer periphery of the first central cylinder in the plane of the flange mounted on the bottom of the adjacent cylinder. A flange 82 is mounted on the inner peripheries of each of the odd numbered cylinders in the plane of flange the next outer cylinder. All of these flanges are provided with spaced apart bolt holes. An annular perforated plate or a plurality of segments of an annular perforated plate 83 is or are held movably against the bottoms of the cylinders forming the walls of the catalyst chambers or reaction zones by two annuli or segments of two annuli 84 and 85 mounted in position by bolts 86 and secured by nuts 87.

The operation of the isothermal or pseudo-isothermal reactor illustrated in FIGURES 6 through 9 is as follows: Flow of heat transfer medium from the reactor is prevented in any suitable manner. Heat transfer medium having a temperature at least 30° F. higher than the temperature to be maintained in the annular catalyst chambers or reaction zones is pumped through inlet(s) 68 onto plate 65. The heat transfer medium flows over the upper surface of plate 65 over the weirs 67 into the first central cylinder and into the ports to the annular heat transfer medium chambers. When the heat transfer medium chambers are filled with heat transfer medium substantially to the level of plate 65 circulation of the heat transfer medium is initiated from the reactor through outlet 79 to a heat transfer medium heater (not shown), and back through heat transfer medium inlet(s) 68 to plate 65. When the temperature of the catalyst beds in the annular reaction zones reaches reaction temperature fluid reactant is introduced through inlet(s) 70 into the outer annular catalyst chamber and through the plurality of conduits 71 into the other annular catalyst chambers or reaction zones. The fluid reactant flows downwardly through the catalyst chambers to the plenum at the base of the reactor and thence through fluid product outlet 88 to means for recovery of product.

An isothermal or pseudo-isothermal reactor for catalytic conversion of fluid reactant in which the fluid reactant flows in series through a plurality of annular catalyst chambers or reaction zones, of which two are shown, and heat transfer medium flows in series from the outermost of a plurality of annular heat transfer medium chambers, of which two are shown, to a central cylindrical heat transfer medium chamber and thence to means for reheating the heat transfer medium to a temperature at least 30° F. above the reaction temperature to be maintained in the annular catalyst chambers or reaction zones is illustrated in FIGURES 10 through 15.

In a cylindrical tank 101 having an upper head 102 and a lower head 103 a plurality of spaced apart impervious cylinders of which four are shown, is rigidly mounted concentric with the vertical axis of the aforesaid cylindrical tank. The outermost cylinder, i.e., the cylinder adjacent the wall of the aforesaid cylindrical tank, is spaced apart from the wall of the cylindrical tank. Thus, the first or central impervious cylinder (I) has outer periphery 104 and inner periphery 105. The second impervious cylinder (II) has outer periphery 106 and inner periphery 107. The third impervious cylinder (III) has outer periphery 108 and inner periphery 109. The fourth impervious cylinder (IV) has outer periphery 110 and inner periphery 111. The inner periphery of the cylindrical tank is designated 112.

The inner periphery of the first and central cylinder and the outer peripheries of the even numbered cylinders and the inner peripheries of the odd numbered cylinders and the inner periphery of the wall of the aforesaid cylindrical tank are the walls of heat transfer medium chambers. Thus, the wall of a first and central heat transfer medium chamber is the inner periphery 105 of a cylindrical heat transfer medium chamber. The outer periphery 106 and the inner periphery 109 are the walls of an annular heat transfer medium chamber. The outer periphery 110 and the inner periphery 112 are the walls of another or second annular heat transfer medium chamber.

The outer periphery 104 of the first central cylinder and the inner periphery 107 of the second impervious cylinder are the walls of an annular catalyst chamber or reaction zone. The outer periphery 108 and the inner periphery 111 are the walls of another annular catalyst chamber or reaction zone.

An annular plate 113 is rigidly mounted horizontally in a heat transfer medium-tight and fluid reactant-tight manner on the inner periphery 112 of the cylindrical tank and the outer periphery 110 of the impervious cylinder adjacent the wall of the cylindrical tank in the region of the upper head 102 of the aforesaid cylindrical tank. An annular plate 114 is rigidly mounted horizontally in a fluid reactant-tight and heat transfer medium-tight manner on the top of the third (III) impervious cylinder and on the outer periphery 106 of the second (II) impervious cylinder. A circular plate 115 is rigidly mounted horizontally in the region of the top of the inner periphery of the first central cylinder. The lower surfaces of annular plates 113 and 114 and the circular plate 115 are in substantially the same horizontal plane.

The central cylinder is provided with at least two heat transfer medium ports and the even numbered cylinders are provided with at least one heat transfer medium port the upper portions of the inner peripheries of which are in substantially the same horizontal plane as the lower surfaces of plates 113, 114 and 115.

Heat transfer medium conduits 116 are rigidly mounted in the aforesaid heat transfer medium ports transverse of the alternate catalyst chambers or reaction zones in a heat transfer medium-tight and fluid reactant medium-tight manner.

An upper head 117 is mounted on the top of the second impervious cylinder. An inlet conduit 118 is rigidly mounted in upper head 102 of the cylindrical tank 101 and in upper head 117 of the second impervious cylinder in a fluid reactant-tight manner. A fluid products outlet 119 is mounted in upper head 102 of cylindrical tank 101 in fluid communication with the last annular catalyst chamber or reaction zone in the series flow of the fluid reactant.

At least one heat transfer medium inlet 120, preferably two diametrically opposed heat transfer medium inlets, is rigidly mounted in the wall of cylindrical tank 101 in the region of the upper head with the upper portion of the inner periphery thereof in substantially the same plane as the lower surface of annular plate 113.

An annular plate 121 is rigidly mounted horizontally in a heat transfer medium-tight manner in the region of the lower part of the outer periphery 110 of the impervious cylinder adjacent the wall of the aforesaid cylindrical tank and on the lower part of the inner periphery 112 of the wall of the aforesaid cylindrical tank 101. A similar annular plate 122 is rigidly mounted horizontally on the peripheries of the impervious cylinders forming the walls of the alternate annular heat transfer medium chambers substantially in the plane of annular plate 121. Heat transfer medium ports are provided in the lower portions of the walls of the impervious cylinder adjacent the wall of the cylindrical tank and the next impervious cylinders. Conduits 123 are mounted horizontally in the aforesaid heat transfer medium ports and transverse of the enclosed catalyst bed in a fluid reactant-tight and heat transfer medium-tight manner. Conduits 123 are mounted with the lower portions of the inner peripheries substantially in the same plane as the upper surfaces of annular plates 121 and 122.

Fluid reactant ports are provided in the walls of the heat transfer medium chambers except the outermost or shell heat transfer medium chamber above the plane of conduits 123. Fluid reactant conduits 124 are rigidly mounted in fluid reactant-tight and heat transfer medium-tight manner transverse of alternate heat transfer medium chambers. An outlet 125 is rigidly mounted in bottom 103 forming a fluid tight connection with the central cylinder.

A flange 126 is rigidly mounted on the outer peripheries of the central and even numbered impervious cylinders at the bottoms thereof. A similar flange 127 is rigidly mounted on the inner peripheries of the odd numbered impervious cylinders in substantially the same plane as the flange of the adjacent even numbered cylinders. The aforesaid flanges are provided with spaced apart bolt holes.

An annular impervious plate 128 or a plurality of segments of such an impervious annular plate is mounted on bolts in the aforesaid spaced apart holes in the flanges 126 and 127. Two annular bands 130 and 131 having spaced apart holes to accept bolts are mounted on said bolts and drawn up against impervious annular plates 218 by nuts. The structure thus provides a movable bottom for each of the annular catalyst chambers or reaction zones which is catalyst-tight.

The isothermal or pseudo-isothermal reactor illustrated in FIGURES 10 through 15 is operated as follows: Heat transfer medium at a temperature at least 30 F. above the temperature to be maintained in the annular catalyst chambers or reaction zones flows through heat transfer medium inlet 120 into annular shell heat transfer medium chamber $H_3$. The heat transfer medium flows through conduits 123 into the next annular heat transfer chamber. The heat transfer medium flows upwardly through heat transfer medium chamber $H_2$ to conduits 116 and thence to first or central heat transfer medium chamber $H_1$. The heat transfer medium flows through central cylindrical heat transfer medium chamber $H_1$ to heat transfer medium outlet 125 and thence to a heat trans- fer medium heater and pump not shown. When the temperature in the annular catalyst chambers or reaction zones has reached reaction temperature fluid reactant is introduced into annular catalyst chamber or reaction zone $C_1$ through fluid reactant inlet 118. The fluid reactant flows downwardly in annular catalyst chamber or reaction zone $C_1$ to conduits 124. The fluid reactant flows through conduits 124 into catalyst chamber $C_2$. The fluid reactant flows upwardly through catalyst chamber or reaction zone $C_2$ to the plenum between upper head 102 and annular plates 113 and 114 and circular plate 115 and thence to products outlet 119.

As those skilled in the art will recognize the foregoing descriptions of the novel isothermal or pseudo-isothermal reactor have been entirely that of the use of the reactor for endothermic reaction. However, the novel isothermal or pseudo-isothermal reactor can be used for exothermic reactions by maintaining the temperature of the heat transfer medium at least 30° F. below the reaction temperature to be maintained in the annular catalyst chambers wherein the exothermic reaction takes place.

An "isothermal" or pseudo-isothermal reactor having no central cylindrical heat transfer medium chamber but having only annular heat transfer jackets and annular catalyst chambers or reaction zones is illustrated in FIGURES 16, 17 and 18. A reactor so constructed for the treatment of 10,000 b./s.d. at a LHSV of 15 comprises a reactor the inside diameter of the shell of which is 172.50 inches, a central hollow cylinder having an inside diameter of 96 inches and 8 additional concentric cylinders. The walls of the concentric cylinders are 0.25 inch thick and provide alternate heat transfer medium jackets and reaction zones four inches wide. The catalyst bed in each catalyst chamber is about 3.12 feet deep. The catalyst and feed are distributed as set forth in the following tabulation:

| Reaction Zone No. | Annular Area, Sq. Ft. | Percent of Total Annular Reaction Zone Area | Annular Volume, Cu. Ft. Ch=3.12 ft.[1] | Bbls. of Catalyst | Bbls. of Fluid Reactant | Percent of Total Hourly Feed | LHSV[2] |
|---|---|---|---|---|---|---|---|
| $C_1$ | 10.1 | 20.3 | 31.5 | 5.6 | 84.0 | 20.3 | 15.0 |
| $C_2$ | 11.7 | 23.5 | 36.5 | 6.3 | 94.5 | 22.9 | 14.9 |
| $C_3$ | 13.2 | 26.5 | 41.2 | 7.4 | 111.0 | 26.8 | 15.0 |
| $C_4$ | 14.8 | 29.7 | 46.2 | 8.3 | 124.0 | 30.0 | 14.95 |
| Total | 49.8 | 100.0 | 155.4 | 27.6 | 413.5 | 100.0 | |

[1] Ch=depth of catalyst.
[2] LHSV=liquid hourly space velocity.

It will be observed that in the "isothermal" or pseudo-isothermal reactor described herein before the inside diameter of the reactor shell is 172.50 inches and that the depth of the annular catalyst bed is 3.12 feet or 37.44 inches. Thus, the preferred form of the reactor of the present invention is one in which the inside diameter of the reactor shell is a multiple of the depth of the annular catalyst beds but does not exceed about 25 to about 30 feet.

Referring now to FIGURES 16, 17 and 18, a reactor in which the inside diameter of the shell is a multiple of the depth of the annular reaction zones is illustrated in these drawings. Thus, an "isothermal" or pseudo-isothermal reactor of the present invention comprises a plurality of concentric spaced apart cylinders of which eight, to wit: 200, 201, 202, 203, 204, 205, 206 and 207 are shown. The outer cylinder 200 is the shell of the reactor and one of the vertical walls of the outer heat transfer medium jacket. Cylinder 200 is provided with a top 208 and a bottom 209. A manhole 210 is mounted in fluid-tight manner in top 208 for ingress. A product outlet 211 is mounted in fluid-tight manner in bottom 209. When desirable, additional manholes can be mounted in both top and bottom.

The outer cylinder 200, the top 208, and bottom 209 are provided with an external layer of insulating material 212 supported in any suitable manner.

At least one and preferably two or more heat transfer medium inlets 213 are mounted in head 208 to deliver heat transfer medium onto the upper surface of plate 214 (which is described more fully hereinafter) to provide for distribution of heat transfer medium to each heat transfer medium jacket in volume dependent upon the volume of each heat transfer medium jacket, $H_1$, $H_2$, $H_3$ and $H_4$.

At least two fluid reactant inlets 215 are rigidly mounted in fluid-tight manner, preferably diametrically, in the upper portion of cylinder 200 below the horizontal plane of plate 214. An annular heat transfer medium plate 216 is rigidly mounted in a fluid-tight manner on the inner periphery of lower portion of cylinder 207. Similar annular plates 217 are rigidly mounted in a fluid-tight manner on the inner periphery of the even numbered cylinders 206 and 204 and on the outer periphery of the odd numbered cylinders 205 and 203. Plates 216 and 217 form the bottoms of the heat transfer jackets and all are mounted in substantially the same horizontal plane near the bottom of the concentric cylinders and preferably in the region of the plane of a mass of particles of inert material such as Alundum (silicon carbide) or alumina 218 in the bottom of the reaction zones, $C_1$, $C_2$, and $C_3$.

A circular plate 219 having a diameter substantially the same as the inside diameter of central or first cylinder 201 is mounted in a fluid tight manner at the bottom of cylinder 201.

An annular plate 220 having an outside diameter substantially the same as the inside diameter of the second cylinder 202 and an inside diameter somewhat greater than the outside diameter of heat transfer medium outlet 221 is rigidly mounted in a fluid-tight maner in substantially the same horizontal plane as plates 216 and 217.

A cylinder 222 having an outside diameter substantially the same as the inside diameter of annular plate 220, a depth somewhat greater than the radius of heat transfer medium outlet 221 and a fluid tight bottom 223 is rigidly mounted in a fluid tight manner in plate 220 with the upper edge of cylinder 222 substantially in the horizontal plane of plate 220.

Annular plate 214 has an outside diameter substantially the same as the inside diameter of cylinder 200 and an inside diameter substantially the same as the outside diameter of central cylinder 201. Annular plate 214 is rigidly mounted in a fluid-tight manner on the inner periphery of cylinder 200, on the outer periphery of central cylinder 201, and on the upper edges of the intervening cylinders 202, 203, 204, 205, 206, and 207. Annular plate 214 is provided with a plurality of annular slots and fluid-tight closures 224 therefor for introducing particle-form solid catalytic material into the reaction zones $C_1$, $C_2$, $C_3$. Annular plate 214 is also provided with a plurality of orifices 225 in the areas of the annular heat transfer medium jackets. The size and distribution of orifices 225 is that required to ensure flow of heat transfer medium to each heat transfer medium jacket in volume dependent upon the volume of each heat transfer medium jacket.

Each of the cylinders 203, 204, 205, 206 and 207, i.e., all of the cylinders except the central and adjacent cylinders (201 and 202) are provided with ports substantially concentric with the extensions of the axes of fluid reactant inlets 215. A conduit 226 is mounted in each heat transfer medium jacket concentric with the extensions of the axes of the aforesaid ports and making fluid-tight joints with the aforesaid ports.

Similar ports, and conduits 227 are mounted in fluid-tight manner with the lower quadrant of the conduits 227 in substantially the same horizontal plane as annular plates 216, 217 and 220.

The cylinders other than the central cylinder 201 and the shell 200 are provided with flanges at the lower edges.

Flanges 228 are mounted on the outer peripheries of the odd numbered cylinders 203, 205, 207. Flanges 229 are mounted on the inner peripheries of the even numbered cylinders 202, 204, 206. Each pair of flanges 228 and 229 are in substantially the same horizontal plane. A foraminous annular plate 230 or a radially divided foraminous annular plate is movably mounted in a catalyst-tight manner against the lower surfaces of each of the pair of flanges 228 and 229 by means of annular strips 231 and 232, bolts 233 and nuts 234.

It is preferred to fill the lower part of each annular reaction chamber $C_1$, $C_2$, $C_3$, $C_4$, etc. from foraminous plate 230 to the level of the bottoms of conduits 227 with graded particles of inert material such as alumina, alundum, etc. The beds of particles of inerts serve as a vapor-solids separator substantially preventing passage of particles of catalytic material which may be entrained by the fluid products.

The "isothermal" or pseudo-isothermal reactor illustrated in FIGURES 16, 17 and 18 is used in the following manner. The bottoms of the reaction zones $C_1$, $C_2$, $C_3$, etc. are filled to the bottoms of conduits 227 with graded particles of an inert such as alumina. The largest particles are placed at the bottoms and the finest particles at the tops of the beds of inert material. The largest particles have a diameter of about 0.75 inch and the finest particles have diameters of about 0.25 inch. The particles of inert material are introduced into the reaction zones through the ports in annular plate 214. Thereafter, the reaction zones are filled with particle-form solid catalytic material to the level of the bottom of plate 214. The closures 224 are then mounted in fluid-tight manner on the ports. Circulation of heat transfer medium having a temperature at least about 30° F. above the reaction temperature is initiated and continued until the temperature in the bed of catalyst in each reaction zone has reached reaction temperature. Fluid reactant, e.g., naphtha and hydrogen-containing gas at reaction temperature flows through inlets 215 and conduits 226 to reaction zones $C_1$, $C_2$, $C_3$, etc. The fluid reactant flows downwardly through the reaction zones, the beds of inert material 218 and the foraminous plates 230 to the plenum below the annular reaction zones and thence through product outlet 211 to a recovery train.

The flow of heat transfer medium is as follows: heat transfer medium is pumped through a heat transfer medium heater (not shown) to heat transfer medium inlet(s) 213 at a temperature at least 30° F. above the reaction temperature. The hot heat transfer medium flows from inlet 213 onto plate 214 and through the orifices or ports 225 in plate 214 into heat transfer medium jackets $H_1$, $H_2$, $H_3$, $H_4$ etc. The size and number of orifice or ports 225 being proportioned to deliver to each heat transfer medium jacket a volume of heat transfer medium dependent upon the volume of the subtended heat transfer medium jacket. The heat transfer medium flows downwardly through the jackets and thence through conduits 227 to heat transfer medium outlet 221 and thence to the heat transfer medium pump.

The "isothermal" or pseudo-isothermal reactor illustrated in FIGURES 16, 17 and 18 can be modified as shown in FIGURE 19 to provide in central cylinder 201 for heat exchange between hot fluid reactant and the heat transfer medium. Thus, fluid reactant at a temperature about 200° F. below the reaction temperature in reaction zones $C_1$, $C_2$, $C_3$, $C_4$ etc. is heated to reaction temperature by heat exchange with the heat transfer medium in heat transfer medium jacket $H_1$. For this purpose, as illustrated in FIGURE 19, a cylinder 250, concentric with cylinder 201, having a diameter about eight inches less than the diameter of central cylinder 201 and a length about four inches less than the height of cylinder 201 is rigidly mounted in cylinder 201 in any suitable manner.

As a result there is an annular space formed between the outer periphery of cylinder 250 and the inner periphery of cylinder 201. An annular plate 251 having an inner diameter substantially that of the outer diameter of fluid reactant inlet 252 and an outer diameter substantially that of the inner diameter of cylinder 201 is rigidly mounted in a fluid-tight manner on the outer periphery of fluid reactant inlet 252 and the inner periphery of cylinder 201 in substantially the same horizontal plane as annular plate 214. A fluid reactant inlet 252 projecting through top 208 is rigidly mounted in a fluid-tight manner in annular plate 251. Fluid reactant inlet 252 makes a fluid-tight joint with top 208. Fluid reactant inlet 252 replaces fluid reactant inlets 215 in FIGURES 16, 17 and 18.

The vertical walls of all of the concentric cylinders except the reactor shell cylinder and the cylinder adjacent thereto, e.g., in FIGURES 16, 17, and 18, cylinders 201, 202, 203, 204, 205 and 206 but not cylinders 207 and 200, are provided with at least two ports. All of the aforesaid ports have the horizontal axes thereof in substantially the same horizontal plane. A conduit is mounted in each heat transfer medium jacket, except the outermost jacket, with the horizontal axis thereof in substantially the same horizontal plane as that of the aforesaid ports. The aforesaid conduits are rigidly mounted in a fluid-tight manner with the upper portion of the outer peripheries somewhat below the horizontal plane of annular plate 214.

Thus, the heat transfer jacket between cylinder 201 and cylinder 202 is provided with at least two fluid reactant conduits 253 and 254. Similarly, in the heat transfer jacket between cylinders 203 and 204 are mounted at least two fluid reactant conduits 255 and 256. Heat transfer jacket $H_3$ (between cylinders 205 and 206) is provided with at least two fluid reactant conduits 257 and 258. In all other respects it is preferred that the embodiment of the present "isothermal" or pseudo-isothermal reactor preferably be the same as illustrated in FIGURES 16, 17, and 18.

In the embodiment of the present "isothermal" or pseudo-isothermal reactor illustrated in FIGURE 19 the flow of heat transfer medium preferably is the same as illustrated in FIGURES 16, 17 and 18 and described hereinbefore. However, in the embodiment of the present invention illustrated in FIGURE 19 the flow of fluid reactant is from the center to the outer reaction zones rather than from the shell to the central reaction zone. In both embodiments of the present invention the fluid reactant flows preferably in parallel through the reaction zones. Thus, the flow of fluid reactant is from a heater not shown to fluid reactant inlet 252. The fluid reactant enters inlet 252 at a temperature about 200° F. below the reaction temperature in reaction zones $C_1$, $C_2$, $C_3$, etc. The fluid reactant flows downwardly through cylinder 250 and upwardly through annular corridor 259 where the fluid reactant is in indirect heat exchange relation with the heat transfer medium flowing downwardly through jacket $H_1$. While flowing upwardly through annular corridor 259, the fluid reactant is heated to reaction temperature. The fluid reactant at reaction temperature flows from annular corridor 259 through conduits 253 and 254. A portion of the fluid reactant dependent upon the horizontal area of the annular reaction zone $C_1$ flows downwardly therethrough. The balance of the fluid reactant flows through conduits 255 and 256 to reaction zone $C_2$ where another portion of the fluid reactant dependent upon the horizontal area of reaction zone $C_2$ flows downwardly through reaction zone $C_2$. The balance of the fluid reactant flows through conduits 257 and 258 to reaction zone $C_3$. In other words, the pressure drop through reaction zones of the same width and filled to the same height with the same catalyst is substantially constant. Therefore, the flow of fluid reactant to each reaction zone is in the same ratio to the total fluid reactant flowing through annular corridor 259 as the ratio of the horizontal area of each reaction zone is to the total horizontal area of all reaction zones.

The fluid reactant flows downwardly through the reaction zones $C_1$, $C_2$, $C_3$ . . . $C_n$ to the plenum between the bottom 209 and the annular reaction zones. From the aforesaid plenum the products of the reaction of the fluid reactant flow through outlet 211 to a recovery train.

Illustrative of the liquid heat transfer media is the well-known mixture of inorganic salts molten at temperatures above about 300° F. comprising about 7 percent sodium nitrate, about 53 percent potassium nitrate, and about 40 percent sodium nitrite and preferably devoid of the carbonate ion. On the other hand, the catalyst in the annular catalyst chambers or reaction zones can be maintained at reaction temperature by means of a fluidized bed of burning particles of fuel as disclosed in the co-pending application for United States Letters Patent Serial No. 712,475, filed January 31, 1958, in the name of Edwin O. Guernsey.

Illustrative of the endothermic reactions is the dehydrogenation of the naphthenes in a naphtha. Thus for example, a straight run naphtha containing about 30 percent by volume of naphthenes, the balance principally paraffins, is heated to about 800° F. to about 980° F. The dehydrogenation of naphthenes in the presence of a platinum group metal dehydrogenation catalyst takes place at about 800° F. to about 1050° F. A molten salt heat transfer medium such as that described hereinbefore is heated to at least 830° F., i.e., about 30° F. above the reaction temperature, and circulated through the heat transfer medium chambers of the novel isothermal or pseudo-isothermal reactor described hereinbefore until the catalyst beds in the annular catalyst chambers or reaction zones have a temperature of at least about 800° F. The heated straight run gasoline is then introduced into the annular catalyst chambers and the temperature and the flow of heat transfer medium through the heat transfer medium chambers regulated to maintain the temperature in the catalyst chambers substantially constant. In no event is the temperature of the products flowing from the outlet of the catalyst chamber more than about 20° to about 25° F. below the reaction temperature.

I claim:

1. An isothermal or pseudo-isothermal reactor for catalytic conversion of fluid reactant comprising a vertical cylindrical tank having an upper head and a lower head, a first substantially impervious central cylinder rigidly mounted concentric with the vertical axis of said cylindrical tank in spaced relation with said upper and lower heads of said cylindrical tank, a plurality of substantially impervious cylinders rigidly mounted substantially concentric with said first central cylinder and in spaced relation with said upper and lower heads of said cylindrical tank, the outer peripheries of the odd numbered cylinders and the inner peripheries of the even numbered cylinders forming the vertical walls of a plurality of annular catalyst chambers, the outer peripheries of the even numbered cylinders and the inner peripheries of the odd numbered cylinders, and the inner periphery of said cylindrical tank together with the outer periphery of the outermost of said plurality of concentric cylinders and inner periphery of the said first central cylinder forming the vertical walls of a plurality of annular heat transfer medium chambers, a circular top plate mounted horizontally in a fluid reactant-tight manner in the region of the top of said first central cylinder, a first upper annular plate mounted horizontally in a fluid reactant-tight manner between the outer peripheries of the even numbered cylinders and the inner peripheries of the odd numbered cylinders and between the outer periphery of the cylinder adjacent the aforesaid cylindrical tank and the inner periphery of the aforesaid cylindrical tank in the region of the upper ends of the aforesaid cylinders, said circular plate and said annular plates being constructed and arranged to exclude fluid reactant from heat transfer medium chambers, a plurality of second upper perforated annular plates vertically spaced downwardly from the aforesaid first annular plates, at least one top conduit mounted horizontally in a heat transfer medium-tight manner between the outer periphery of said first central cylinder and the inner periphery of the adjacent cylinder, between the outer peripheries of the odd numbered cylinders and the inner peripheries of the even numbered cylinders with the inner peripheries of the aforesaid conduits being in the plane of the lower surfaces of said circular plate and said first upper annular plates and in the plane of the upper surfaces of said second upper annular perforated plates, each of said plurality of cylinders having orifices for the receipt of said conduits, a circular bottom plate mounted horizontally in a fluid product-tight manner on the inner periphery of said first central cylinder in the region of the bottom thereof, a plurality of lower annular plates mounted horizontally in a fluid product-tight manner between outer peripheries of the even numbered cylinders and the inner peripheries of the odd numbered cylinders and between the outer periphery of the cylinder adjacent said cylindrical tank and the inner periphery of said cylindrical tank in the plane of the aforesaid circular bottom plate, at least one bottom conduit mounted in a heat transfer medium-tight manner between the outer periphery of said first central cylinder and the inner periphery of the adjacent cylinder and between the outer peripheries of the odd numbered cylinders and the inner peripheries of the even numbered cylinders, the inner peripheries of said conduits being in the planes of the upper surfaces of said lower annular plates, each of said plurality of cylinders having orifices for the receipt of said conduits, a foraminous plate movably mounted on the bottom of the walls of the annular catalyst chambers constructed and arranged to support beds of particle-form catalytic material and to provide for the efflux of fluid reactant from said annular catalyst chambers, said first upper annular plates, said second upper perforated annular plates, said top conduits, said annular heat transfer medium chambers, said circular bottom plate, said lower annular plates, and said bottom conduits being constructed and arranged to provide a heat transfer medium circuit for flow of heat transfer medium into said heat transfer medium chambers, and for parallel flow of heat transfer medium through said heat transfer medium chambers, means for introducing heat transfer medium into said heat transfer medium circuit, means for withdrawing heat transfer medium from said heat transfer medium circuit, means for introducing fluid reactant into said annular catalyst chambers, and means for withdrawing fluid product from said annular catalyst chambers.

2. An isothermal or pseudo-isothermal reactor for catalytic conversion of fluid reactant as described and set forth in claim 1 wherein a layer of insulating material is mounted on the outer surface of said cylindrical tank.

3. An isothermal or pseudo-isothermal reactor for catalytic conversion of fluid reactant as described and set forth in claim 1 wherein the flow of heat transfer medium is downward in the heat transfer chambers.

4. An isothermal or pseudo-isothermal reactor for catalytic conversion of fluid reactant as described and set forth in claim 1 wherein the total area of the perforations in each of said second upper perforated annular plates is controlled to regulate the volume of heat transfer medium passing through said perforations in proportion to the volume of the subtended heat transfer medium chamber and the distance from the heat transfer medium inlet.

5. In an isothermal or pseudo-isothermal reactor as described and set forth in claim 1 wherein a plurality of spaced apart annular segmental troughs is substituted for each of said second upper perforated annular plates, and the heat transfer medium is delivered to said troughs, the height of the sides of said troughs being regulated to deliver heat transfer medium to each heat transfer medium chamber in proportion to the volume thereof and the distance from the heat transfer medium inlet.

6. An isothermal or pseudo-isothermal reactor for catalytic conversion of fluid reactant comprising a cylindrical tank having an upper and a lower head, a first central substantially impervious cylinder rigidly mounted substantially concentric with the vertical axis of said cylindrical tank and spaced apart from said upper and lower heads of said cylindrical tank, a plurality of spaced apart substantially impervious cylinders rigidly mounted substantially concentric with said first central cylinder and spaced apart from said upper and lower heads, said first central cylinder being a heat transfer medium chamber, and the outer peripheries of the even numbered cylinders and the inner peripheries of the odd numbered cylinders, and the outer periphery of the cylinder adjacent said cylindrical tank wall and the inner periphery of said cylindrical tank being the vertical walls of annular heat transfer medium chambers, the inner peripheries of the even numbered cylinders and the outer peripheries of the odd numbered cylinders being the vertical walls of annular particle-form solid catalyst chambers, an upper annular plate rigidly mounted horizontally in a heat transfer medium-tight manner on the tops of said cylinders, and the inner periphery of said cylindrical tank, said annular plate having at least two segmental annular inlets for each heat transfer medium chamber, a weir mounted at the radial edges of each segmental annular inlet, the height of said weirs being proportioned to the volume of the subtended heat transfer medium chamber and the distance thereof from the heat transfer inlet, at least one heat transfer medium-tight conduit rigidly mounted horizontally in the upper part of the walls of each of said annular heat transfer medium chambers and below the aforesaid annular plate constructed and arranged to provide confined passage of fluid reactant therethrough to the adjacent annular catalyst chamber, an annular plate mounted horizontally at the bottom of each annular heat transfer medium chamber, at least one fluid reactant-tight conduit rigidly mounted horizontally in the lower part of the walls of each of said annular particle-form catalyst chambers having the lowest portion of the inner periphery thereof in the plane of the upper surfaces of the aforesaid annular plates at the bottom of each annular heat transfer medium chamber constructed and arranged to provide confined passage for heat transfer medium, at least one heat transfer medium inlet in the aforesaid first central cylinder in the plane of the conduit in the lower part of the adjacent annular catalyst chamber conduit, means in said first central cylinder below the plane of said heat transfer medium inlet for withdrawing heat transfer medium from said first central cylinder, a perforated, annular plate movably mounted on the walls of each annular catalyst chamber below the plane of the aforesaid fluid reactant-tight conduit constructed and arranged for passage of fluid product and separation of particulate solids therefrom, means for introducing fluid reactant into the horizontal conduit mounted in the upper part of the walls of the outermost heat transfer medium chamber, means for withdrawing fluid product from said cylindrical tank, and means for delivering heat transfer medium to the upper surface of said upper annular plates.

7. An isothermal or pseudo-isothermal reactor for catalytic conversion of fluid reactant constructed and arranged to provide flow of heat transfer medium from an outermost annular heat transfer medium chamber to a central cylindrical heat transfer medium chamber in series through interposed annular heat transfer chambers and to provide flow of fluid reactant from a central annular catalyst chamber to an outermost annular catalyst chamber in series through interposed annular catalyst chambers which comprises a vertical cylindrical tank having an upper head and a lower head, a plurality of mutually spaced apart cylinders comprising at least a first central cylinder and an outermost cylinder, said outermost cylinder being spaced apart from the wall of said cylindrical tank, and all of said cylinders except the outermost being spaced apart from said upper head and all of said cylinders being spaced apart from the lower head of said cylindrical tank, said central cylinder being a heat transfer medium chamber, the outer peripheries of the even numbered cylinders and the inner peripheries of the odd numbered cylinders, and the outer periphery of the outermost cylinder and the inner periphery of the wall of said cylindrical tank being the vertical walls of a plurality of annular heat transfer medium chambers, the outer peripheries of the odd numbered cylinders including that of the first central cylinder and the inner peripheries of the even numbered cylinders being the vertical walls of a plurality of annular catalyst chambers, the outermost cylinder of said plurality of cylinders being rigidly mounted in a fluid reactant-tight manner on the inner periphery of said upper head, a first upper annular plate rigidly mounted horizontally on the outer periphery of the aforesaid outermost cylinder and on the inner periphery of the wall of said cylindrical tank in the upper portion thereof, a horizontal circular plate rigidly mounted on the tops of all of the other cylinders, annular segmental fluid reactant inlets in said horizontal circular plate for introduction of fluid reactant into the central annular catalyst chamber and for egress of fluid product from the outermost annular catalyst chamber, a vapor-tight fluid reactant inlet mounted in said upper head of said cylindrical tank and on said circular plate with the inner periphery of said fluid reactant inlet in the vertical plane of the outer circumference of the segmental fluid reactant inlets in the aforesaid circular plate to the central annular catalyst chamber, a fluid product outlet in said upper head of said cylindrical tank in fluid communication with the outermost annular catalyst chamber, at least one fluid reactant conduit mounted substantially horizontal in the lower portion of the innermost annular heat transfer medium chambers other than the outermost constructed and arranged for confined flow of fluid reactant from one contiguous annular catalyst chamber to the other contiguous catalyst chamber, at least one fluid reactant conduit mounted substantially horizontal in the upper portion of each of the other annular heat transfer medium chambers other than the outermost constructed and arranged for confined flow of fluid reactant from one contiguous catalyst chamber to the other contiguous catalyst chamber, at least one heat transfer medium conduit mounted substantially horizontal in the upper portion of the central annular catalyst chamber and in each of the alternate catalyst chambers constructed and arranged for confined flow of heat transfer medium from one contiguous heat transfer medium chamber to the other heat transfer medium chamber, at least one heat transfer medium conduit mounted substantially horizontal in the lower portion of each of the other catalyst chambers constructed and arranged for confined flow of heat transfer medium from one contiguous heat transfer medium chamber to the other heat transfer medium chamber, an annular plate movably mounted in a substantially fluid reactant-tight manner on the bottoms of the walls of the aforesaid catalyst chambers, an annular plate mounted in a substantially heat transfer medium-tight manner on the bottoms of the walls of the aforesaid heat transfer medium chambers, means located in the lower portion of said central cylindrical heat transfer medium chamber for the withdrawal of heat transfer medium, and at least one heat transfer medium inlet in the upper portion of the wall of the aforesaid cylindrical tank and in fluid communication with the outermost heat transfer medium chamber.

References Cited in the file of this patent

UNITED STATES PATENTS

| | | |
|---|---|---|
| 1,850,398 | Jaeger | Mar. 22, 1932 |
| 1,920,886 | Pier et al. | Aug. 1, 1933 |
| 2,236,083 | Alther | Mar. 25, 1941 |
| 2,472,254 | Johnson | June 7, 1949 |
| 2,573,149 | Kassel | Oct. 30, 1951 |
| 2,779,716 | Newman | Jan. 29, 1957 |
| 2,886,507 | Elliott et al. | May 12, 1959 |